United States Patent
McLaughlin et al.

(10) Patent No.: US 11,294,843 B2
(45) Date of Patent: Apr. 5, 2022

(54) ON-PROCESS MIGRATION OF CONTROLLER(S) TO UTILIZE AN IO POOL

(71) Applicant: Honeywell International Inc., Morris Plains, NJ (US)

(72) Inventors: Paul Francis McLaughlin, Morris Plains, NJ (US); Joseph Pradeep Felix, Morris Plains, NJ (US); James Michael Schreder, Morris Plains, NJ (US); John Rosa-Bian, Morris Plains, NJ (US); Jason Thomas Urso, Morris Plains, NJ (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/835,732

(22) Filed: Mar. 31, 2020

(65) Prior Publication Data

US 2021/0303499 A1    Sep. 30, 2021

(51) Int. Cl.
*G06F 13/40* (2006.01)
*G05B 19/042* (2006.01)

(52) U.S. Cl.
CPC ..... *G06F 13/4027* (2013.01); *G05B 19/0423* (2013.01); *G05B 2219/25443* (2013.01)

(58) Field of Classification Search
CPC ............ G06F 13/4027; G05B 19/0423
See application file for complete search history.

(56) References Cited

U.S. PATENT DOCUMENTS

| | | | |
|---|---|---|---|
| 7,515,972 B2 | 4/2009 | Kumar et al. | |
| 7,555,752 B2 | 6/2009 | Groot et al. | |
| 9,665,089 B2 | 5/2017 | Schreder et al. | |
| 9,875,207 B2 | 1/2018 | Lv et al. | |
| 9,873,346 B2 | 5/2018 | McLaughlin et al. | |
| 10,175,682 B2 | 1/2019 | Peake et al. | |
| 10,176,606 B2 | 1/2019 | Jammikunta et al. | |
| 10,178,177 B2 | 1/2019 | McLaughlin et al. | |
| 10,997,113 B1 * | 5/2021 | Reineke | G06F 13/4221 |

(Continued)

FOREIGN PATENT DOCUMENTS

WO    2019227401 A1    12/2019

OTHER PUBLICATIONS

Extended European search Report for corresponding EP Application No. 21164739.1.

*Primary Examiner* — Phong H Dang
(74) *Attorney, Agent, or Firm* — John Maldjian; Stevens & Lee PC

(57) ABSTRACT

A process control system includes a first process controller coupled to a first set of input/output (I/O) modules that provided first channels, including an I/O software agent coupled to an I/O module pool that includes a first and at least a second I/O module collectively providing pooled channels. The first channels and the pooled channels are each coupled by a respective field device to first and second processing equipment, respectively. The I/O software agent is configured for enabling addition of the first set of I/O modules to the LO module pool, coupling of a plurality of additional process controllers in a controller pool to the first process controller, and enabling at least one of i) making any of the first channels available to any of the process controllers in the controller pool, and ii) making any of the pooled channels available to the first process controller.

17 Claims, 4 Drawing Sheets

(56) References Cited

U.S. PATENT DOCUMENTS

| | | | |
|---|---|---|---|
| 2015/0019191 A1* | 1/2015 | Maturana | G05B 19/0423 |
| | | | 703/13 |
| 2015/0154136 A1 | 6/2015 | Markovic et al. | |
| 2015/0215300 A1* | 7/2015 | Buonacuore | H04L 63/205 |
| | | | 700/40 |
| 2015/0278144 A1 | 10/2015 | McLaughlin et al. | |
| 2017/0359222 A1* | 12/2017 | Dutta | H04L 61/103 |
| 2018/0364673 A1* | 12/2018 | Van Wensen | G05B 9/03 |
| 2019/0324874 A1* | 10/2019 | Gill | G06F 9/45558 |
| 2020/0313960 A1* | 10/2020 | Rosa-Bian | G06F 11/2048 |

* cited by examiner

ON-PROCESS MIGRATION OF CONTROLLER(S) TO UTILIZE AN IO POOL

CROSS-REFERENCE TO APPLICATIONS

This application has subject matter related to application Ser. No. 16/377,237 entitled "CONTROL HIVE ARCHITECTURE ENGINEERING EFFICIENCY FOR AN INDUSTRIAL AUTOMATION SYSTEM" that was filed on Apr. 7, 2019, and application Ser. No. 16/377,239 entitled "I/O MESH ARCHITECTURE FOR AN INDUSTRIAL AUTOMATION SYSTEM" that was also filed Apr. 7, 2019.

FIELD

Disclosed embodiments relate to industrial automation systems including process control systems.

BACKGROUND

Processing facilities, or industrial plants, are typically managed using industrial automation systems. Example processing facilities include manufacturing plants, chemical plants, crude oil refineries, and ore processing plants.

Conventional process control systems generally include a plurality of controllers which can comprise redundant controllers having a controller pair. Each controller includes computing hardware and an associated memory that stores needed software for controlling. The controllers are each coupled by one or more dedicated input/output (110) modules to field devices comprising sensors and actuators for controlling processing equipment in the plant.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize for process control systems conventional process controllers having dedicated I/O module(s) do not have access to the I/O modules in the process control system which are dedicated to other process controllers. Customers with already configured conventional control systems having conventional controller arrangements with their own dedicated I/O modules absent a major control system redesign are unable to utilize I/O modules in the process control system that are dedicated to other process controllers.

Disclosed aspects include methods and systems for creating an I/O module pool (or I/O Highly Integrated Virtual Environment (HIVE)) commercially available from Honeywell International) from I/O modules in existing conventional I/O modules that are dedicated to specific process controllers, despite these dedicated I/O modules not having been designed to have I/O shared pool (I/O pool) capability. An I/O pool, which is only known to be implemented by a hardware arrangement which acts as a conduit/pathway for any of the process controllers in the process control system to utilize any of the I/O modules including those located in a remote or centralized I/O cabinet, is provided herein instead by a disclosed I/O software agent or I/O application (or app).

When the I/O software agent is added to an associated memory of what is referred to as a first process controller (which may also be termed an existing, original, or legacy process controller), the I/O agent makes available the I/O modules previously dedicated to the first process controller(s) to become part of a now larger I/O pool, and thus also available to the other process controllers in the process control system that may already be configured in a controller pool. The I/O software agent thus provides the benefit of at least one of i) enabling first (existing) process controllers to have access to any of the I/O modules in an I/O module pool, and ii) for the process controllers in the controller pool to have access to the previously dedicated I/O modules associated with the first process controller, while avoiding the need for a redesign of the process control system to implement either of these features.

One disclosed embodiment comprises a method of process control in a process control system that controls a process comprising providing a first process controller that is coupled to a first set of I/O modules. The first controller includes an I/O software agent that is coupled to an I/O module pool, in the first set of I/O modules comprises a first I/O module and at least a second I/O module. Each I/O module has multiple channels, and each channel is connected (e.g., wired such as by a cable) to a different field device, where the first set of I/O modules are coupled to a plurality of first processing equipment.

The I/O software agent enables access to the first set of I/O modules, thus making them a part of the I/O pool. The FO software agent also enables a plurality of additional process controllers configured together in a controller pool to be coupled to the first process controller, and enables at least one of i) making any of the first channels available to any of the process controllers in the controller pool, and ii) making any of the pooled channels available to the first process controller. The I/O software agent can enable both i) and ii), thus acting bidirectionally.

Figure 1:
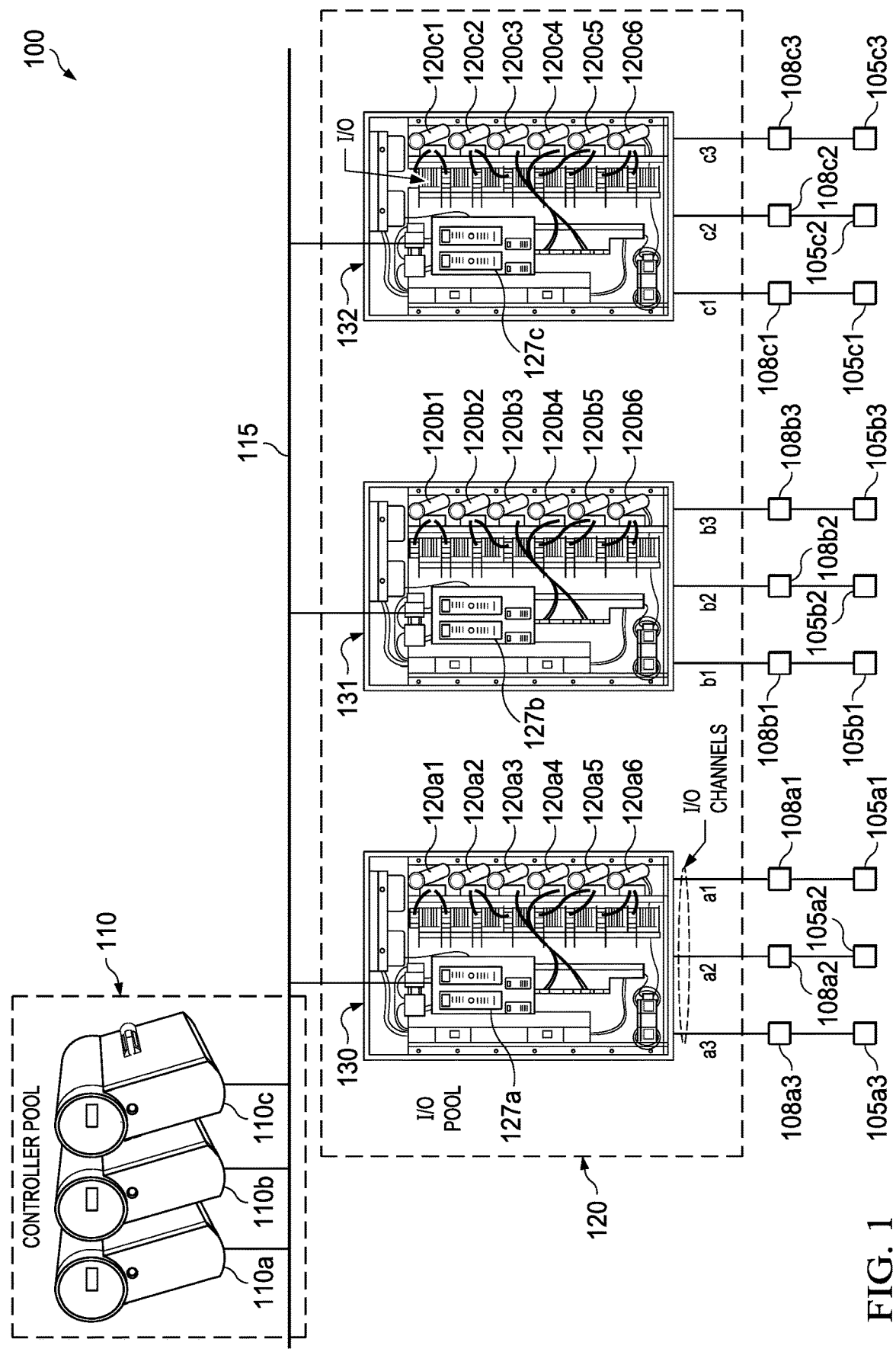
FIG. 1 depicts a portion of an example process control system that includes both a process controller pool and an I/O module pool, where the process control system shown can utilize a disclosed I/O software agent, according to an example embodiment.

making any of the first channels available to any of the process controllers in the controller pool, and ii) making any of the pooled channels available to the first process controller, according to an example embodiment.

DETAILED DESCRIPTION

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

As used herein an industrial process facility runs an industrial process involving a tangible material that dis- closed embodiments apply. For example, oil and gas, chemical, beverage, pharmaceutical, pulp and paper manufacturing, petroleum processes, electrical, and water. An industrial process facility is distinct from a data processing system that only performs data manipulations.

Disclosed aspects enable customers with existing process control systems utilizing a conventional control system architecture to leverage the benefits of an I/O module pool and/or process controller pool, without a hardware redesign by migrating to pool arrangements on-process. Possible reasons to migrate to a pool arrangement include the existing controllers referred to herein as first controllers can have access to spare I/O modules that can be made available to the process controllers running in the controller pool. Process control running in the first controller(s) can use pooled channels supported by the I/O modules in the I/O module pool in addition to the locally bound (dedicated) channels imported by the I/O module that they are currently using.

Figure 2:
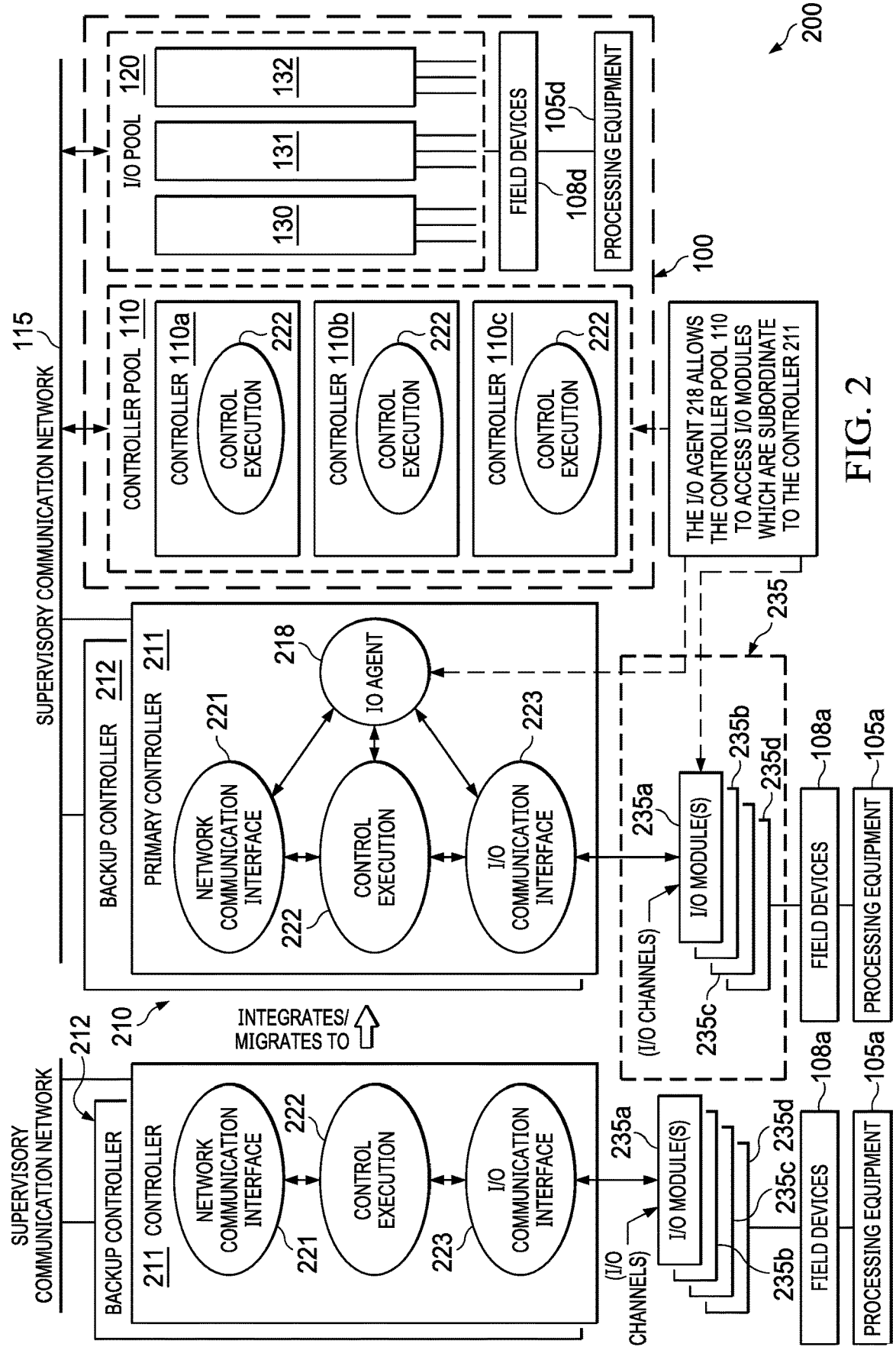
FIG. 2 depicts a disclosed migration/integration process enabled by a disclosed I/O software agent, where a conventional controller arrangement shown as a single first controller platform including a primary controller and an optional redundant/backup controller that has a plurality of dedicated I/O modules is integrated into the process control system in FIG. 1 that includes both a process controller pool and an I/O module pool. The I/O software agent allows the other process controllers shown in the process controller pool that are coupled to the first controller platform to access the first controller's otherwise dedicated I/O modules.

FIG. 1 depicts a portion of an example process control system 100 that includes both a process controller pool 110 and an I/O module pool 120 that are coupled together by a supervisory communication network 115, such as an Ethernet network, where the process control system 100 can utilize a disclosed I/O software agent, according to an example embodiment. FIG. 2 described below shows the I/O software agent as 218. The supervisory communication network 115 can also comprise a wired or a wireless network.

The process controller pool 110 is configured to decouple the controller software (such as application modules) from the controller hardware. Specifically, the controller pool (or HIVE) of controllers isolates (or compartmentalizes) software functions, such as control execution into software modules which can be distributed across the process controllers in the controller pool 110, rather than be dedicated to a single controller, and also provides an alternate form of redundancy rather than the traditional 1:1 redundancy.

The I/O module pool 120 is shown including I/O cabinet enclosures 130, 131, and 132 each including an I/O communication interface(s) 127a, 127b, 127c, also called I/O gateways. Each I/O communication interface 127a-c has multiple associated I/O modules shown in FIG. 1 having six I/O modules. Specifically, I/O cabinet enclosure 130 is shown having I/O modules 120a1, 120a2, 120a3, 120a4, 120a5 and 120a6, I/O cabinet enclosure 131 is shown having I/O modules 120b1, 120b2, 120b3, 120b4, 120b5, and 120b6, and I/O cabinet enclosure 132 is shown including I/O modules 120c1, 120c2, 120c3, 120c4, 120c5 and 120c6.

Each I/O module has multiple I/O channels, shown for simplicity having with three channels, comprising channels a1, a2, and a3, for I/O modules 120a1-120a6, channels b1, b2 and b3 for I/O modules 120b1-b6, and channels c1, c2 and c3 for I/O modules 120c1-c6. Each channel is connected to different field device (comprising sensors and actuators) shown for in FIG. 1, with each of channels a1, a2, a3 coupled to a single field device 108a1, 108a2, 108a3, channels b1, b2, b3 each coupled to a single field devices 108b1, 108b2, 108b3, and with channels c1, c2 and c3 each coupled to a single field devices 108c1, 108c2 and 108c3. Each field device is shown by example only coupled to a different piece of first processing equipment shown as 105a1, 105a2, 105a3, 105b1, 105b2, 105b3, 105c1, 105c2, and 105c3 so that in the example shown in FIG. 1 a single channel controls each piece of the plurality of first processing equipment. However, the channels and the field devices as known in the art do not necessarily map 1:1 to the first processing equipment as shown in FIG. 1 because field devices each associated with a channel can also control the same piece of processing equipment.

Multiple process controllers (shown as 110a, 110b, 110c) in the controller pool 110 are thus effectively configured as a single scalable controller that can run the controller function for the entire process control system 100. The I/O module pool 120 functions to decouple its I/O modules 120a1-120a6, 120b1-120b6, 120c1-120c6 from being conventionally dedicated to a specific one of the process controllers in the controller pool 110. The I/O module pool 120 is thus functioning as being distributed and thus becomes an extension of modular equipment. Any process controller 110a, 110b, 110c in the controller pool 110 can thus access any of the channels supported by any of the I/O modules 120a1-120a6, 120b1-120b6, 120c1-120c6 in the I/O module pool 120.

FIG. 2 depicts a disclosed migration/integration process enabled by a disclosed I/O software agent 218 from a conventional control arrangement where a single first controller platform 210 shown including a primary controller 211 and an optional redundant/backup controller 212 that has a plurality of dedicated I/O modules 235a, 235b, 235c, and 235d shown collectively as 235, is integrated into a process control system 200 that includes the example process control system 100 in FIG. 1 that as described above includes both a process controller pool 110 and an I/O module pool 120. The respective field devices coupled to the output of the I/O pool 120 are collectively shown in FIG. 2 as 108d, and the respective second processing equipment coupled to the field devices 108d are collectively shown in FIG. 2 as 105d. The respective field devices coupled to the output of the I/O modules 235a-235d are collectively shown in FIG. 2 as 108a, and the respective first processing equipment coupled to the field devices 108a is collectively shown in FIG. 2 as 105a.

The I/O software agent 218 is shown included as part of the first controller platform 210. The I/O software agent 218 is configured to allow the other process controllers 110a, 110b, and 110c in the process controller pool 110, that are coupled to the first controller platform 210 to access any of the first controller platform's 210 otherwise dedicated channels supported by the I/O modules 235.

The first controller platform 210 is shown also including a network communication interface 221, Honeywell International's Control Execution Environment (CEE) shown as 'control execution' 222, and in I/O communication interface 223. The I/O software agent 218 can be added to a memory of the first controller platform 210 via an on-process firmware upgrade, thereby enabling any of the channels supported by the I/O modules in the dedicated I/O modules 235 to be made available to any of the process controllers 110a, 110b, 110c in the controller pool 110. The first controller platform 210 that is running the I/O software agent 218 can be a Honeywell International C300 controller, although the same disclosed concept can be applied to other process controllers, for example Honeywell International's Enhanced High Performance Process Manager (EHPM) which is a process-connected device on the Enhanced Universal Control Network (EUCN) that provides regulatory control and sequence operations, Honeywell International's Control Edge Unit Operations Controller (UOC) through the same mechanism can add an I/O software agent as well.

Figure 3:
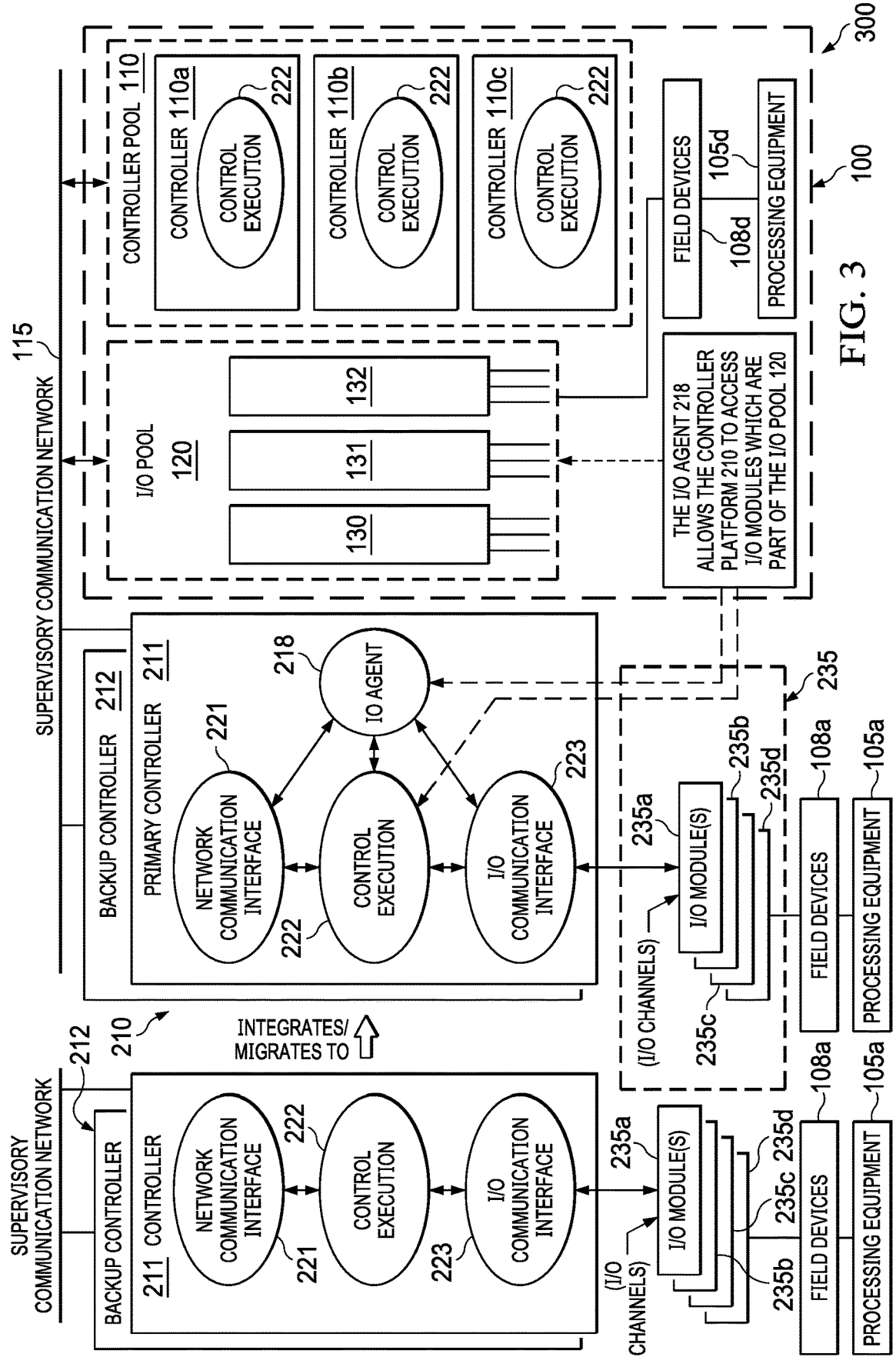
FIG. 3 depicts a disclosed I/O software agent from a conventional control arrangement, where a single first controller platform is shown again including a primary controller and an optional redundant/backup controller, that has a plurality of dedicated I/O modules, which is integrated into the process control system shown in FIG. 1. The I/O software agent allows the first controller platform to now access any of the pooled channels supported by the I/O modules in the I/O module pool.

FIG. 3 depicts a disclosed I/O software agent 218 from a conventional control arrangement, where a single first controller platform 210 is shown again including a primary controller 211 and an optional redundant/backup controller 212, that has a plurality of dedicated I/O modules 235, which is integrated into a process control system 300 includes the process control system 100 shown in FIG. 1. As with FIG. 2, the respective field devices are each collectively shown as 108a and 108d, and the respective first and second processing equipment are again as in FIG. 2 collectively shown as 105a and 105d. The I/O software agent 218 allows the first controller platform 210 to access any of the channels supported by the I/O modules in the I/O module pool 120 again shown including I/O modules 120a1-120a3, 120b1-120b3, and 120c1-120c3.

Figure 4:
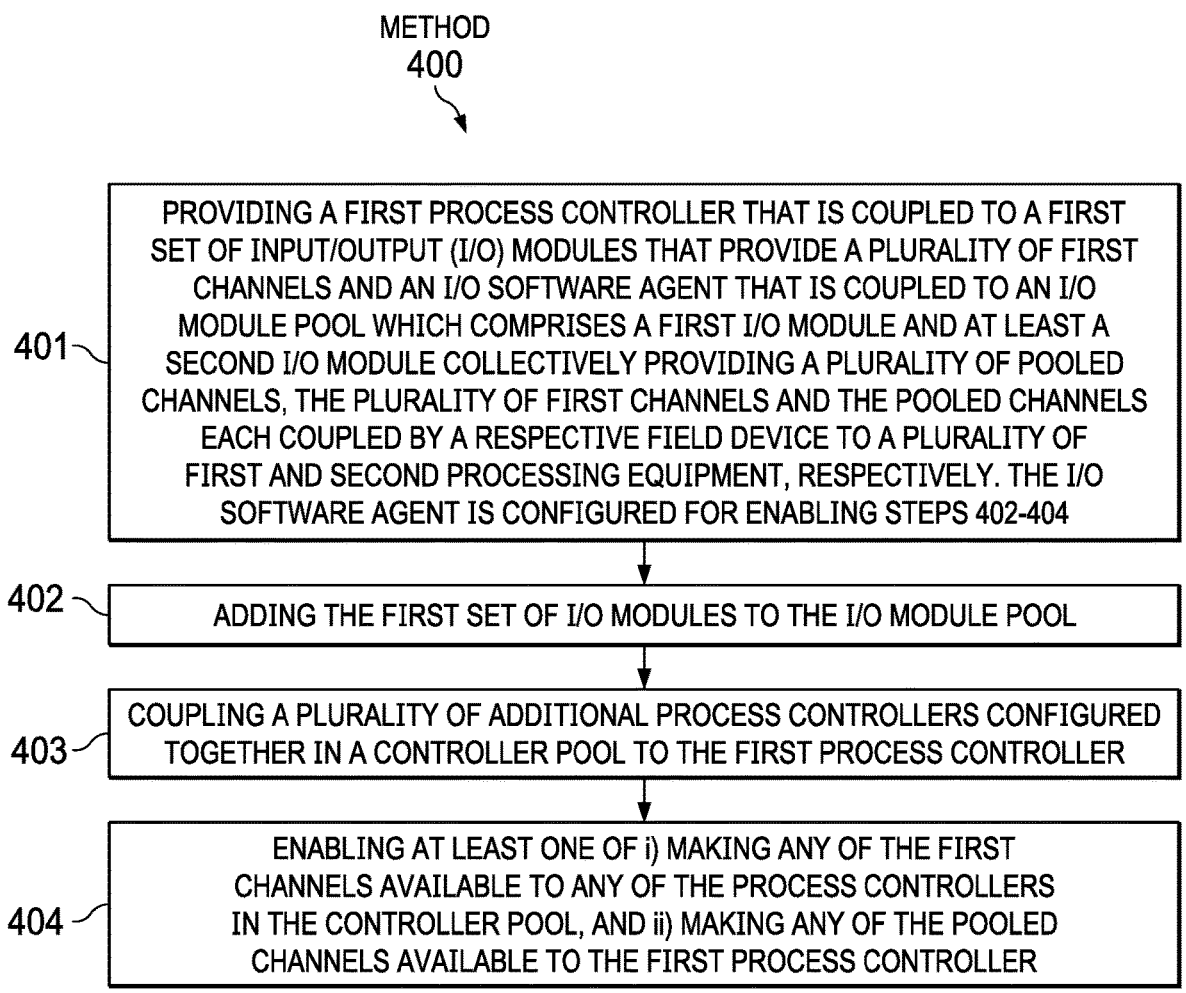
FIG. 4 is a flow chart that shows steps in a method of on-process migration of a process controller to add its first channels in a first set of I/O modules to an I/O module pool that provides pooled channels associated with process controllers in a controller pool, and enabling at least one of i)

FIG. 4 is a flow chart that shows steps in a method 400 of on-process migration of a process controller in a process control system that controls a process to add its first channels supported by a first set of I/O modules to an I/O module pool that provides pooled channels associated with process controllers in a controller pool, according to an example embodiment.

Step 401 comprises providing a first process controller that is coupled to a first set of I/O modules collectively providing a plurality of first channels, including an I/O software agent that is coupled to an I/O module pool which comprises a first I/O module and at least a second I/O module that collectively provides a plurality of pooled channels, the plurality of first channels and the pooled channels each coupled by a respective field device to a plurality of first and second processing equipment, respectively. The first process controller can be a redundant process controller to help enable on-process migration.

The dedicated I/O modules associated with the first controller are not yet part of an I/O module pool, because it is a disclosed I/O software agent which enables access of these previously specific controller dedicated I/O modules to the I/O pool. The I/O software agent is configured for enabling steps 402 to 404 described below. In step 402 the I/O software agent enables addition of the first set of I/O modules to the I/O module pool. Step 403 comprises coupling a plurality of additional process controllers configured together in a controller pool to the first process controller. Step 404 comprises the I/O software agent enabling at least one of i) making any of the first channels available to any of the process controllers in the controller pool, and ii) making any of the pooled channels available to the first process controller.

The I/O software agent can enable both the i) and the ii) thus acting bidirectionally. The process control system can comprise a distributed control system (DCS). The first process controller and the plurality of additional process controllers can each comprise redundant process controllers. The first process controller, the plurality of additional process controllers, and the I/O pool can all be coupled together by a supervisory communication network. The method can take place while the process control system is running the process, and the process can involve at least one tangible material. The I/O module pool can further comprise I/O communication interfaces that are each associated with respective ones of the first I/O module and the second I/O module.

Disclosed embodiments can be applied to a variety of process control systems, such as chemical, refining and oil and gas industries. In addition, other applications include renewable energy systems.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A method of process control in a process control system that controls a process, comprising:
providing a first process controller that is coupled to a first set of input/output (I/O) modules that provide a plurality of first channels, and an I/O software agent that is coupled to an I/O module pool which comprises a first I/O module and at least a second I/O module collectively providing a plurality of pooled channels, the plurality of first channels and the pooled channels each coupled by a respective field device collectively comprising sensors and actuators to a plurality of first and second processing equipment which are configured together for running the process, respectively, wherein the I/O software agent is configure to enable:
adding the first set of I/O modules to the I/O module pool;
coupling a plurality of additional process controllers configured together in a controller pool to the first process controller; and
enabling at least one of i) making any of the first channels available to any of the process controllers in the controller pool, and ii) making any of the pooled channels available to the first process controller.

2. The method of claim 1, wherein the I/O software agent enabling comprises the i) and the ii).

3. The method of claim 1, wherein the process control system comprises a distributed control system (DCS).

4. The method of claim 1, wherein the first process controller and the plurality of additional process controllers each comprise redundant process controllers.

5. The method of claim 1, wherein the first process controller, the plurality of additional process controllers, and the I/O pool are all coupled together by a supervisory communication network.

6. The method of claim 1, wherein the method takes place while the process control system is running the process, and wherein the process involves processing at least one tangible material.

7. The method of claim 1, wherein the I/O module pool further comprises I/O communication interfaces that are each associated with respective ones of the first I/O module and the second I/O module.

8. A process control system configured to control a process, comprising:
- a first process controller that is coupled to a first set of input/output (I/O) modules providing a plurality of first channels, including an I/O software agent that is coupled to an I/O module pool;
- wherein the I/O module pool comprises a first I/O module and at least a second I/O module collectively providing a plurality of pooled channels;
- the plurality of first channels and the pooled channels each coupled by a respective field device collectively comprising sensors and actuators to a plurality of first and second processing equipment which are configured together for running the process, respectively;
- the I/O software agent is configured for:
  - adding the first set of I/O modules to the I/O module pool,
  - coupling of a plurality of additional process controllers configured together in a controller pool to the first process controller, and
  - enabling at least one of i) making any of the first channels available to any of the process controllers in the controller pool, and ii) making any of the pooled channels available to the first process controller.

9. The system of claim 8, wherein the I/O software agent is for enabling the i) and the ii).

10. The system of claim 8, wherein the process control system comprises a distributed control system (DCS).

11. The system of claim 8, wherein the first process controller and the plurality of additional process controllers each comprise redundant process controllers.

12. The system of claim 8, wherein the first process controller, the plurality of additional process controllers, and the I/O pool are all coupled together by a supervisory communication network.

13. The system of claim 8, wherein the process involves processing at least one tangible material.

14. The system of claim 8, wherein the I/O module pool further comprises I/O communication interfaces that are each associated with respective ones of the first I/O module and the second I/O module.

15. A non-transitory computer readable medium containing instructions for implementing a I/O software agent that when executed by a processor device of a first process controller in a process control system for running a process that is coupled to a first set of input/output (I/O) modules providing a plurality of first channels each coupled by a field device collectively comprising sensors and actuators to a first plurality of processing equipment, the I/O software agent configured for coupling to an I/O module pool which comprises a first I/O module and at least a second I/O module collectively providing a plurality of pooled channels each coupled by a respective field device to a second plurality of processing equipment the first and the second processing equipment configured together for running the process, the I/O software agent for:
- enabling addition of the first set of I/O modules to the I/O module pool;
- coupling a plurality of additional process controllers configured together in a controller pool to the first process controller, and
- enabling at least one of i) making any of the first channels available to any of the process controllers in the controller pool, and ii) making any of the pooled channels available to the first process controller.

16. The non-transitory computer readable medium of claim 15, wherein the I/O software agent is for enabling the i) and the ii).

17. The non-transitory computer readable medium of claim 15, wherein the I/O software agent method is configured to operate while the process control system is running the process, and wherein the process involves processing at least one tangible material.

* * * * *